United States Patent [19]

Howell

[11] 4,123,168

[45] Oct. 31, 1978

[54] LASER OPTICAL LEVER ADJUNCT

[75] Inventor: Thomas H. Howell, Huntsville, Ala.

[73] Assignee: The United States of America as represented by the Secretary of the Army, Washington, D.C.

[21] Appl. No.: 818,187

[22] Filed: Jul. 22, 1977

[51] Int. Cl.$^2$ .................. G01B 11/26; G01C 1/00
[52] U.S. Cl. .................................... 356/152; 356/154
[58] Field of Search ............... 356/139, 150, 152, 154; 244/3.13, 3.16

[56] References Cited

U.S. PATENT DOCUMENTS

| | | | |
|---|---|---|---|
| 3,851,844 | 12/1974 | Stripling et al. | 244/3.16 |
| 3,875,402 | 4/1975 | Parkin | 244/3.16 |
| 3,891,323 | 6/1975 | Ryan et al. | 89/41 L |
| 3,964,695 | 6/1976 | Harris | 244/3.13 |

OTHER PUBLICATIONS

Sweigart et al.; *Optical Lever Flight Instrumentation;* Report No. RT-TR-70-28; U.S. Army Missile Command; Oct. 1970.

*Primary Examiner*—S. C. Buczinski
*Attorney, Agent, or Firm*—Nathan Edelberg; Robert P. Gibson; Harold W. Hilton

[57] ABSTRACT

A system and apparatus for accurate measurement of a rocket's attitude that includes a laser source placed downrange and pointed towards the rocket with a diverging beam. The beam will be intercepted by a mirror on the rocket's ogive, and the reflected beam will then be presented on a vertical target. A detector assembly positioned behind the vertical target plane detects the centroid of the reflected energy and provides an analog output signal.

3 Claims, 5 Drawing Figures

LASER OPTICAL LEVER ADJUNCT

DEDICATORY CLAUSE

The invention described herein may be manufactured, used, and licensed by or for the Government for governmental purposes without the payment to me of any royalties thereon.

BACKGROUND OF THE INVENTION

This invention relates to the field of rocket launching and mallaunch measuring. When hot gas is used to spin-up rockets during launch, a significant amount of smoke engulfs the muzzle. The smoke interferes with the standard optical lever technique of measuring mallaunch. This is the most critical phase of flight, i.e., defining the mallaunch rate and aim axis as the rocket exits the launcher. Sometimes, the trajectory coverage is obliterated for the first 10-15 feet of travel. A camera which is positioned downrange and off-line is sighted towards the rocket. The rocket ogive has an optical flat which has been aligned normal to the spin axis. The camera is focused on a target matrix, latin square, which has also been positioned downrange and off-line by reflection from the optical flat. During launch, the camera records photographic images of the centroid on the latin square. Data reduction efforts from the sequential pictures consume approximately 40 man hours.

SUMMARY OF THE INVENTION

The present invention has provided a solution to the smoke interference problem as well as a mechanization which will greatly reduce data reduction efforts by the use of analog output signals. A laser source or transmitter is pointed towards the rocket with a diverging beam that is intercepted by a mirror on the rocket's ogive. The reflected beam is then presented on a vertical target and a detector assembly is positioned either forward or behind the vertical target plane to pick up the reflected energy from the screen and provide an analog output signal.

The invention may be better understood from the following detailed description taken in conjunction with the accompanying drawing.

DESCRIPTION OF THE PREFERRED EMBODIMENT

Figure 1:
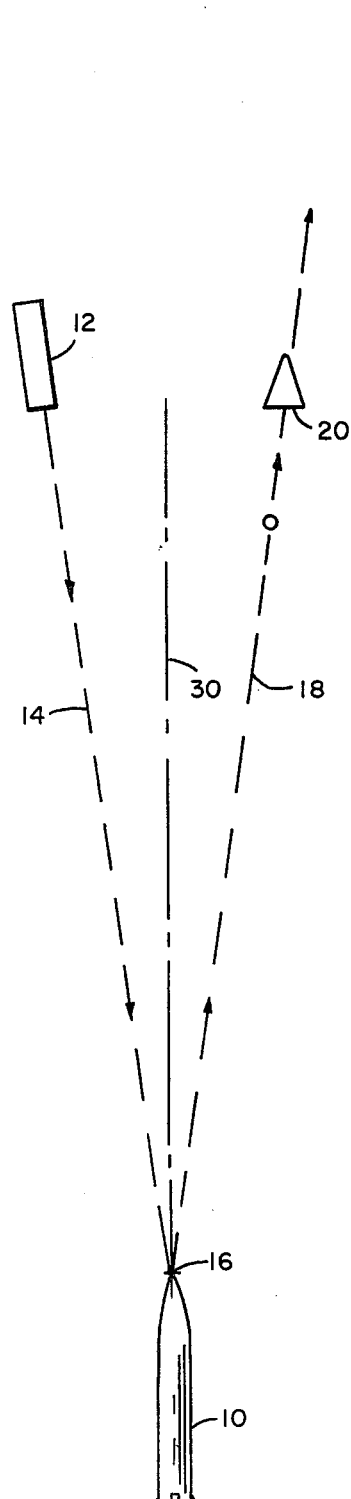
FIG. 1 is a schematic of the laser optical lever adjunct system.
Figure 2:
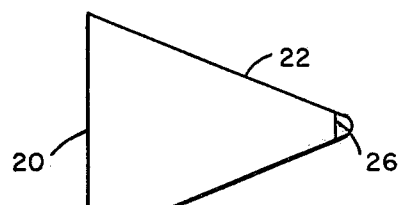
FIG. 2 is a side view of the detector assembly.
Figure 3:
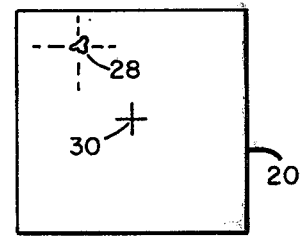
FIG. 3 is a view of the detector vertical plane.

As seen in FIG. 1, a rocket 10 is positioned for launch and a laser source or transmitter 12 is placed downrange pointed towards the rocket with a diverging beam 14. The beam will be intercepted by a mirror 16 which has been normally aligned and mounted on the rocket's ogive and a reflected beam 18 will then be presented on a vertical target 20 (vertical to the earth's surface). This target includes a framework assembly 22 shown in FIG. 2 and a vertical plane 20 shown in FIG. 3. The detector assembly 26 is positioned behind the plane 20 and will locate the centroid 28 of the reflected energy 18 within ± ½ inch relative to the plane's 20 grid center 30. The analog output signals are picked up on the bi-lateral detector assembly 26 and must have a frequency response in the range of 0-50 to −200 Hz for most rocket applications.

The magnitude of the analog output signals is proportional to the relative position of the centroid 28 to the plane's grid center 30. Given the relative position (XYZ) of the source 12, mirror 16, and the centroid 28, one can determine the relative attitude of the rocket 10. However, a pulse repetition frequency at the laser source must be in the 400-2000 pps regime to meet the requirements of most rocket applications.

Figure 2A:
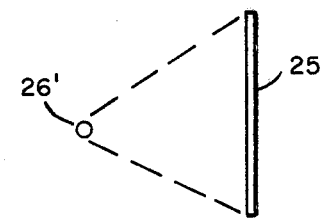
FIG. 2a is a side view of the detector assembly with the detector in front of the screen.

Plane 20 is frosted to enhance the location of the centroid's signature. In some applications, placement of the detector assembly 26 may be precluded by application restraints. However, mechanization can be effected merely by placing the detector assembly 26' in front of the screen 20 which is comprised of a reflective surface 25. This arrangement is shown in FIG. 2a. Typically, the detector has a ½° angular resolution, 1:100. When stationed 100 inches, forward or aft of the vertical plane 20, and with the proper optics ahead of the detector, the centroid 28 can be located within ±1 inch in the vertical plane 20. The distance from the source 12 to the vertical plane 20 is approximately 4000 inches. With the angular resolution, this equates to 1 part in 4000 or ¼ mil measurement of the rocket's attitude. The relative short distance of 335 feet should be insignificant for power loss. Additional energy may be needed to penetrate the volume of smoke and hot gas. Spatial position of mirror as a function of time as well as the XYZ survey coordinates for the source will be required to define a plane containing the source 12, rocket's ogive mirror 16, and the plane intercept point 28. This is not a new requirement. It is also needed for the present technique.

The smoke generated at the muzzle may act as a diffused reflector, possibly increasing the reflected energy on the vertical screen causing a low level scatter. This may require placement of the sensor in front of the screen 20. Definition of the source parameters, i.e., CW or pulsed, wavelength and power is a unique system requirement.

Figure 4:
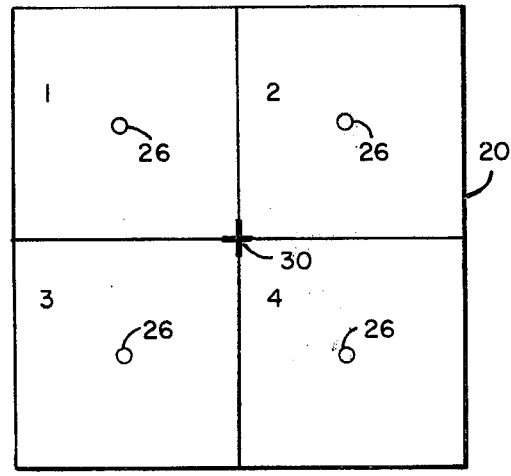
FIG. 4 is a view of a plurality of vertical planes.

The system's sensitivity can be enhanced by using multiple detectors which are coupled together to provide a greater resolution of the centroid's location. Such an arrangement is shown in FIG. 4 where the plane 2 is sectioned into four quadrants. A separate detector assembly is used for each of the separate quadrants. Thus, it can be seen that a controid's resolution will be greatly refined in location of the vertical plane through the use of multiple detector assemblies 26.

I claim:

1. An apparatus for measuring rocket attitude during the launch phase comprising: a laser source for providing a laser beam, said source being pointed towards said rocket along an off-line axis with respect to the longitudinal rocket axis; a mirror positioned on said rocket normally aligned to the longitudinal axis of said rocket for intercepting said laser beam and a target for receiving the reflected laser beam off-axis with respect to said rocket axis, said target including a plane showing the effect of the laser beam thereon and a detector assembly positioned behind said plane for producing analog signals to locate the position of the energy so that the rocket's attitude can be determined.

2. An apparatus as set forth in claim 1 wherein the laser source has a pulse repetition frequency in the 400-2000 PPS and said detector is bi-lateral and has a response in the range of 50-200 Hz.

3. An apparatus as set forth in claim 2 wherein said target includes a plurality of ganged opaque planes and bi-lateral detectors to increase the system's sensitivity.

* * * * *